Patented Apr. 5, 1932

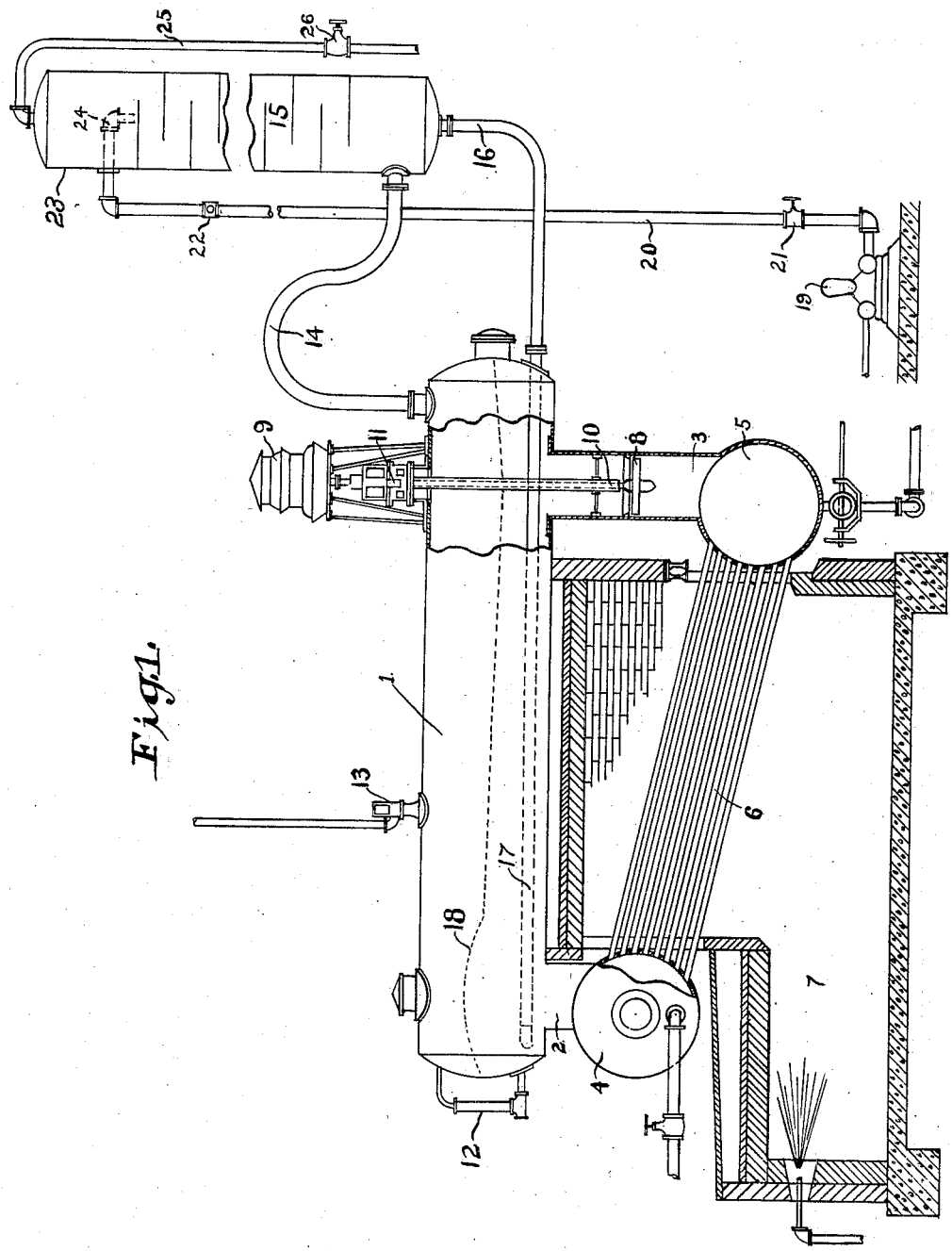

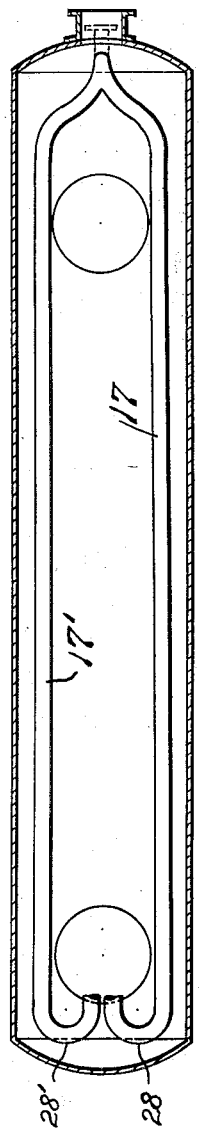
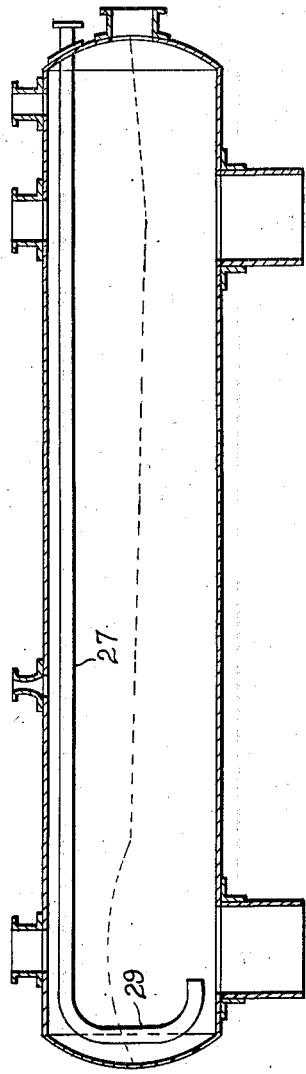

1,852,972

UNITED STATES PATENT OFFICE

ULYSSES S. JENKINS, OF CHICAGO, ILLINOIS, AND NORMAN H. RANSTEAD, OF WHITING, AND WILLIAM H. HILDEBRANDT, OF HAMMOND, INDIANA, ASSIGNORS TO JENKINS PETROLEUM PROCESS COMPANY, INC., OF CHICAGO, ILLINOIS, A CORPORATION OF ILLINOIS

PROCESS AND APPARATUS FOR TREATING HEAVIER HYDROCARBONS

Application filed July 21, 1928. Serial No. 294,439.

This invention relates to a method and apparatus for treating heavier hydrocarbons such as petroleum oils and particularly a method and apparatus whereby a maximum yield of a condensable desirable light hydrocarbon may be obtained from heavier hydrocarbons.

One object of our invention is to provide a method and apparatus for the continuous production of gasoline and other desirable light hydrocarbons under pressure and at a cracking temperature in a closed still comprising a heating bank of tubes expanded into upper and lower transverse drums, which drums are subjacent to front and rear sluiceways, and which sluiceways are connected with a superimposed drum, said drum being connected by vapor release and reflux return lines to a baffle tower of known design. The continuous production of gasoline and other desirable light hydrocarbons occurs coincident with the introduction of fresh material through the baffle tower, there being a continuous release from baffle tower of the desired fractions of the light hydrocarbons produced and a continuous unimpeded or induced reflux to the still of the heavy ends thereof. There also occurs a continuous rejection of a portion of still contents substantial in amount as compared with the fresh material continuously fed into the baffle tower; these co-functions being attended with a simultaneous positive cyclic circulation of the entire bulk still content.

Another object of our invention is to prevent undue accumulation of reflux material, including charging stock, in any part of the baffle tower and to maintain its normal flow into the still at a location ensuring a path of free travel sufficient to expel any entrained gaseous or light end products before absorption into the tube bank circulation. The prevention of such undue accumulation in baffle tower is especially necessary when high volatility gasoline is being produced with its coincident increased quantity of reflux material.

A further object of our invention is to continuously admit to the tube bank circulation only intermediates from which entrained gaseous or light end products have been removed in a path of free travel throughout the length of longitudinal drum, thus preventing a separation of such vaporous bodies in the tube bank proper with resultant formation of carbon deposits on the inner surface of such tubes with the usual attendant evils.

A still further object of our invention is to continuously return to still all baffle tower reflux, including charging stock, in a manner and by an apparatus which will preheat the returning flow in a closed tubular path, in contra-current to the rapidly flowing circulatory stream, and to discharge such reflux at an unimpeded angle to the main positive circulatory current of the bulk still contents in its upward path through the front sluiceway, said discharge thereby continuously absorbing increments of potential and kinetic energy in the respective vaporization of the lighter products of the reflux stream and intimate dispersion of the heavier products in the circulatory current with a minimum disturbance to the correlative conditions of temperature, pressure, and rates of ordinary charging, gasoline production and flow of reject.

An additional object of our invention is to introduce all adsorbents into the still in a manner and by an apparatus so as to initially encounter at an unimpeded angle the main positive circulatory stream of the bulk still contents in its upward path through front sluiceway at the beginning of its zone of minimum surface tension, thus securing in the free path of transition from liquid to gaseous phase a maximum adsorptive effect; and continuously translating a portion of the kinetic energy of such upward circulatory current into a maximum dispersive effect therein.

Any suitable adsorbent may be introduced into the still but it is preferred that hydrated lime be used.

Another object of our invention is to return to the still all baffle tower reflux, together with charging stock and adsorbents, in a manner and by an apparatus so as to reduce to a minimum any deleterious effect which it might otherwise have upon the temperature conditions of the circulatory stream in the still.

A known method of introduction of baffle tower reflux comprises its direct admission through the rear end of the upper longitudinal drum at a point below the normal liquid level. Another known method of entrance consists in admitting the reflux directly into the rear sluiceway, to be immediately absorbed in the circulatory stream adjacent its entrance to the bank of heating tubes.

The first of these methods has the disadvantage of discharging the reflux, charging stock, etc., in countercurrent to the positive liquid circulatory flow, a portion of whose kinetic energy is expended in retarding the entering reflux stream to the extent of often causing an accumulation or head of the latter in the baffle tower, with resultant irregularity of feed and the more dangerous irregularly intermittent and sudden release of large volumes of accumulated material of relatively low boiling point into the bulk still content; such irregularity of feed and sudden admission of material of the nature described being prejudicial both to a regular production of desirable light hydrocarbons and to operating safety.

The second known method of admission of reflux has the disadvantage of absorbing directly into the tube bank circulation all reflux, containing any entrained gas or light ends. Under such conditions the gaseous entrained products separate in the tubes, which become overheated at upper surface to which the gas rises with resultant deposit of carbon and ultimate shortening of the run.

To avoid these conditions we introduce all reflux, charging stock and adsorbents through a line entering the upper longitudinal drum at rear end, preferably at a point near the bottom thereof, and immediately after entrance to drum preferably divide the flow into two or more lines of a combined greater cross sectional area than entering line; extending the branches in longitudinal axial lines to the front of still and turning same again towards the rear, so that the streams will issue directly in the path of front sluiceway discharge, in this way preheating all reflux approximately to temperature of bulk still contents, and discharging the reflux in a manner and at a location so as to obtain the previously described objectives.

In order that the method and apparatus employed may be more clearly understood, we refer to the accompanying drawings, of which Figure 1 is a cross sectional side elevation of a typical unit for carrying out our invention, and Figure 2 a plan view of the lower half of upper longitudinal drum. Figure 3 is a cross sectional side elevation of upper longitudinal drum showing a modified arrangement of the tube line.

The general apparatus comprises an upper longitudinal drum 1, with connecting front and rear sluiceways 2 and 3, joined to upper and lower transverse drums 4 and 5, these being united by bank of tubes 6 which are in turn heated by furnace 7; positive circulation of still contents being effected by the propeller 8, located in rear sluiceway 3, and driven by motor 9, by means of shaft 10, passing through stuffing box 11.

The upper longitudinal drum is provided with liquid level gauge 12, safety-valve 13, and vapor line 14, discharging to baffle tower 15, with reflux return therefrom through line 16; the latter dividing into a plurality of branches, of which we preferably employ two, 17 and 17'.

In actual operation the system is charged with heavy hydrocarbons to be processed at approximately the level 18, in the upper longitudinal drum 1, as indicated by the liquid level gauge 12. The oil is heated by the furnace 7, under a pressure and at a temperature best suited to obtain the desired objectives of yield and quality of desirable light hydrocarbons; constant positive circulation being maintained in the meantime by propeller 8.

As soon as light hydrocarbons begin to be produced, continuous charging of fresh material and adsorbents is effected at operating pressure by charging pump 19, through line 20, past control valve 21 and check valve 22, to top of baffle tower 23; thence through distributing device 24, descending baffle tower in contra-current to ascending gasoline and light oil vapors entering the baffle tower through vapor line 14.

Oil is maintained in the still at level 18 indicated by gauge 12 by continuously discharging from the still past control valve 30, through draw-off line 29; such rate of discharge being influenced by the quality of oil being cracked, baffle tower reject, and speed of feed.

The lighter partially dephlegmated fractions, consisting principally of gasoline are continuously released at top of tower through line 25, past pressure control valve 26 to be further refined; the heavier end products, together with charging stock and added adsorbents, flowing to upper longitudinal drum 1 through reflux line 16; the latter after entering drum dividing into branches 17 and 17', in which the reflux stream is preheated to approximately the bulk still temperature in its passage across drum.

The branch lines 17 and 17' terminate in return bends 28 and 28' which discharge the reflux stream in the positive circulatory flow emerging from the front sluiceway. A portion of the kinetic and heat energy of the circulatory stream is expended in respectively mechanically and physically vaporizing the entrained gaseous and light end content of the reflux stream, the final removal of all low boiling point entrainment being effected as the reflux mingles with the circulatory current in its free passage across the upper drum, so that the flow entering the rear sluiceway is freed from entrained products and the objectionable effects thereof.

In Figure 3 the tubular reflux line is shown entering the rear end of the still 1 near the top, extending along the longitudinal axial line 27 inside the still and terminating in the downward and reverse bend 29, the discharge end of which is directed tangentially to the circulatory stream emerging from the front sluiceway into the superimposed longitudinal drum.

For production of gasoline containing an exceptionally high percentage of constituents boiling under 212° F., or where it is desired to obtain an induced suction effect on reflux stream, we employ an angle of discharge to the upward positive circulatory flow, varying from 0° to 45° depending on effect desired, but for gasoline of ordinary quality we prefer to employ a discharge angle from 45° to 90°; it being a feature of our invention that whereas the reflux stream may enter upper drum and flow in enclosed tubular paths contra-current to the bulk still circulatory current for purposes of heat transfer, it may not discharge into same at any impeded angle to flow thereof.

Other advantages will appear to one familiar with the art and what we claim as new and desire to protect by Letters Patent is:

1. In an oil cracking still containing a drum, a series of heating tubes, a connecting passage for circulating oils from said drum into said heating tubes and a second connecting passage for circulating oils from said heating tubes back into said drum, a reflux tower connected to said drum by a vapor line, and a tubular conduit directly connected between said reflux tower and said drum, said tubular conduit terminating within said drum adjacent said second connecting passage with the discharge end of said tubular conduit directed toward the flow of oils through said drum in such a manner as to produce an eductive effect on oils discharged from said conduit into said drum.

2. In an oil cracking still containing a drum, a series of heating tubes, a connecting passage for circulating oils from said drum into said heating tubes and a second connecting passage for circulating oils from said heating tubes back into said drum, a reflux tower connected to said drum by a vapor line, and a tubular conduit directly connected between said reflux tower and said drum, said tubular conduit entering said drum adjacent said first connecting passage, extending within said drum in indirect heat interchange with oils circulated therein, and terminating within said drum adjacent said second connecting passage whereby oils discharged from said conduit into said drum are circulated substantially throughout the length of said drum in intimate contact with the oils therein prior to introduction into said heating tubes.

3. In an oil cracking still containing a drum, a series of heating tubes, a connecting passage for circulating oils from said drum into said heating tubes and a second connecting passage for circulating oils from said heating tubes back into said drum, a reflux tower connected to said drum by a vapor line, and a tubular conduit directly connected between said reflux tower and said drum, said tubular conduit entering said drum adjacent said first connecting passage, extending within said drum in indirect heat interchange with oils circulated therein, and terminating within said drum adjacent said second connecting passage with the discharge end of said tubular conduit directed toward the flow of oils through said drum in such a manner as to produce an eductive effect on oils discharged from said conduit into said drum.

4. In an oil cracking still containing a drum, a series of heating tubes, a connecting passage for circulating oils from said drum into said heating tubes and a second connecting passage for circulating oils from said heating tubes back into said drum, a tubular conduit for charging oils into said still, said tubular conduit entering said drum adjacent said first connecting passage, extending within said drum in indirect heat interchange with oils circulated therein, and terminating within said drum adjacent said second connecting passage with the discharge end of said tubular conduit directed toward the flow of oils through said drum in such a manner as to produce an eductive effect on oils discharged from said conduit into said drum.

5. An oil cracking process for the production of gasoline and other oils from heavy hydrocarbon oils which includes the steps of circulating the heavy hydrocarbon oils under pressure through a series of heating tubes, discharging said hydrocarbon oils at a cracking temperature from the heating tubes into one end of an enlarged drum to evolve vapors from said oils, flowing the unvaporized oils through said drum to the other end thereof for recirculation through said heating tubes, passing the evolved vapors into a reflux tower, condensing and separating in said tower heavier fractions of said vapors from lighter fractions thereof, releasing the lighter fractions from said tower, conducting condensed fractions from said tower into said drum by a path separate from that of the evolved vapors passing into said tower, discharging said condensed fractions into direct contact with the hot oils in said drum substantially at the point of entrance thereto of the hydrocarbon oils discharged from said heating tubes and in the direction of flow of oils through said drum to effect an induced flow of condensed fractions from said tower into said drum, flowing said condensed fractions in admixture with the hot oils in said drum to the other end thereof to effect a separation of vaporized products from said condensed fractions, and recirculating the unvaporized portion of said condensed fractions in admixture with unvaporized oils in said drum through said heating tubes to be resubjected to cracking temperatures therein.

6. An oil cracking process for the production of gasoline and other oils from heavy hydrocarbon oils which includes the steps of circulating the heavy hydrocarbon oils under pressure through a series of heating tubes, discharging said hydrocarbon oils at a cracking temperature from the heating tubes into one end of an enlarged drum to evolve vapors from said oils, flowing the unvaporized oils through said drum to the other end thereof for recirculation through said heating tubes, passing the evolved vapors into a reflux tower, condensing and separating in said tower heavier fractions of said vapors from lighter fractions thereof, releasing the lighter fractions from said tower, passing said condensed fractions in a path separate from that of the evolved vapors substantially throughout the length of said drum in countercurrent to the flow of hot oils therethrough to effect an indirect heat interchange therewith, discharging said condensed fractions into direct contact with the hot oils in said drum substantially at the point of entrance thereto of the hydrocarbon oils discharged from said heating tubes and in the direction of flow of oils through said drum to effect an induced flow of condensed fractions from said tower into said drum, flowing said condensed fractions in admixture with the hot oils in said drum to the other end thereof to effect a separation of vaporized products from said condensed fractions, and recirculating the unvaporized portion of said condensed fractions in admixture with unvaporized oils in said drum through said heating tubes to be re-subjected to cracking temperatures therein.

7. An oil cracking process for the production of gasoline and other oils from heavy hydrocarbon oils which includes the steps of circulating the heavy hydrocarbon oils under pressure through a series of heating tubes, discharging said hydrocarbon oils at a cracking temperature from the heating tubes into one end of an enlarged drum to evolve vapors from said oils, flowing the unvaporized oils through said drum to the other end thereof for recirculation through said heating tubes, passing the evolved vapors into a reflux tower, condensing and separating in said tower heavier fractions of said vapors from lighter fractions thereof, releasing the lighter fractions from said tower, conducting condensed fractions from said tower into said drum by a path separate from that of the evolved vapors passing into said tower, discharging said condensed fractions in a plurality of streams into direct contact with the hot oils in said drum substantially at the point of entrance thereto of the hydrocarbon oils discharged from said heating tubes and in the direction of flow of oils through said drum to effect an induced flow of condensed fractions from said tower into said drum, flowing said condensed fractions in admixture with the hot oils in said drum to the other end thereof to effect a separation of vaporized products from said condensed fractions, and recirculating the unvaporized portion of said condensed fractions in admixture with unvaporized oils in said drum through said heating tubes to be re-subjected to cracking temperatures therein.

8. An oil cracking process for the production of gasoline and other oils from heavy hydrocarbon oils which includes the steps of circulating the heavy hydrocarbon oils under pressure through a series of heating tubes, discharging said hydrocarbon oils at a cracking temperature from the heating tubes into one end of an enlarged drum to evolve vapors from said oils, flowing the unvaporized oils through said drum to the other end thereof for recirculation through said heating tubes, passing the evolved vapors into a reflux tower, introducing additional hydrocarbon oil into said tower to condense and separate therein heavier fractions of said vapors from lighter fractions thereof, releasing the lighter fractions from said tower, conducting condensed fractions intermixed with the additional hydrocarbon oil from said tower into said drum by a path separate from that of the evolved vapors passing into said tower, discharging said condensed fractions intermixed with additional hydrocarbon oil into direct contact with the hot oils in said drum substantially at the point of entrance thereto of the hydrocarbon oils discharged from said heating tubes and in the direction of flow of oils through said drum to effect an induced flow of condensed fractions intermixed with additional hydrocarbon oil from said tower into said drum, flowing said condensed fractions in admixture with additional hydrocarbon oil and the hot oils in said drum to the other end thereof to effect a separation of vaporized products from said condensed fractions, and recirculating the unvaporized portion of said condensed fractions in admixture with additional hydrocarbon oil and other unvaporized oils in said drum through said heating tubes to be re-subjected to cracking temperatures therein.

9. An oil cracking process for the production of gasoline and other oils from heavy hydrocarbon oils which includes the steps of circulating the heavy hydrocarbon oils under pressure through a series of heating tubes, discharging said hydrocarbon oils at a cracking temperature from the heating tubes into one end of an enlarged drum to evolve vapors from said oils, flowing the unvaporized oils through said drum to the other end thereof for recirculation through said heating tubes, passing the evolved vapors into a reflux tower, introducing additional hydrocarbon oil containing an adsorptive material into said tower, condensing and separating in said tower heavier fractions of said vapors from lighter fractions thereof, releasing the lighter fractions from said tower, conducting condensed fractions intermixed with the additional hydrocarbon oil containing adsorptive material from said tower into said drum by a path separate from that of the evolved vapors passing into said tower, discharging said condensed fractions intermixed with additional hydrocarbon oil containing adsorptive material into direct contact with the hot oils in said drum substantially at the point of entrance thereto of the hydrocarbon oils discharged from said heating tubes and in the direction of flow of oils through said drum to effect an induced flow of condensed fractions intermixed with additional hydrocarbon oil containing adsorptive material from said tower into said drum, flowing said condensed fractions in admixture with additional hydrocarbon oil containing adsorptive material and the hot oils in said drum to the other end thereof to effect a separation of vaporized products from said condensed fractions, and recirculating the unvaporized portion of said condensed fractions in admixture with additional hydrocarbon oil containing adsorptive material and other unvaporized oils in said drum through said heating tubes to be re-subjected to cracking temperatures therein.

In testimony whereof we have affixed our signatures.

ULYSSES S. JENKINS.
NORMAN H. RANSTEAD.
WILLIAM H. HILDEBRANDT.

CERTIFICATE OF CORRECTION.

Patent No. 1,852,972.  April 5, 1932.

ULYSSES S. JENKINS, ET AL.

It is hereby certified that the State of Incorporation of the assignee in the above numbered patent was erroneously described and specified as "Illinois" whereas said State of Incorporation should have been described and specified as Wisconsin as shown by the records of assignments in this office; and that the said Letters Patent should be read with this correction therein that the same may conform to the record of the case in the Patent Office.

Signed and sealed this 5th day of December, A. D. 1933.

F. M. Hopkins (Seal) Acting Commissioner of Patents.